United States Patent Office 3,362,761
Patented Jan. 9, 1968

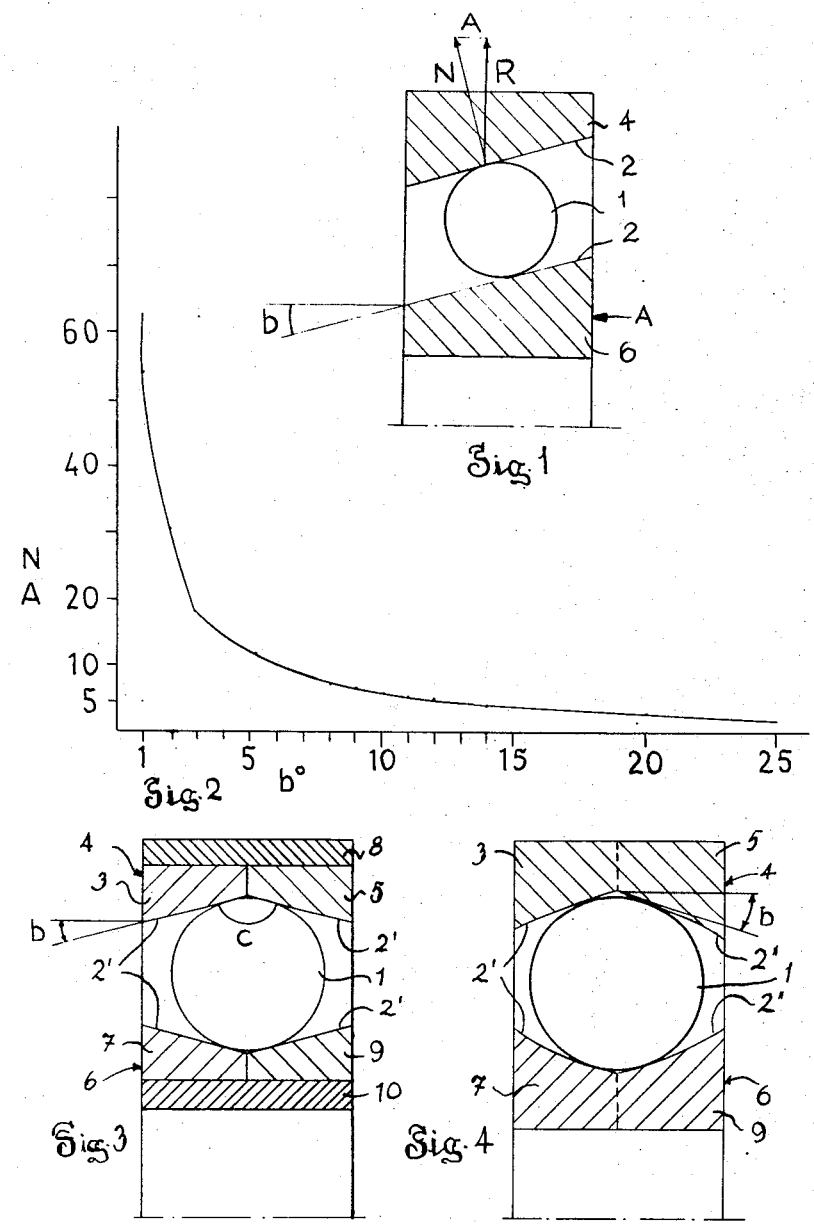

3,362,761
BALL BEARINGS
Stig Holger Bjarne Zachariassen, Bombay, India
(Rindogatan 52, Stockholm 1, Sweden)
Filed Oct. 18, 1965, Ser. No. 497,301
Claims priority, application Sweden, Oct. 19, 1964,
12,559/64
7 Claims. (Cl. 308—193)

ABSTRACT OF THE DISCLOSURE

A ball bearing designed to carry both radial loads and thrust loads and to be mounted as a unit. An outer bearing ring has a raceway extending around the inner wall of the same and an inner bearing ring has a raceway extending around the outer wall of the same. A set of balls is received within both raceways. A holder means is provided for the balls, wherein both the outer ring ball raceway and the inner ring ball raceway has two surfaces, each of which is formed by portions of the shell of a cone frustum or by the surface of a zone of a sphere or is generated by a rotating curved line so that each of the balls engages both the inner ring ball raceway and the outer ring ball raceway at two spaced apart or separated points of contact, and wherein the ball tangent planes at these points of contact make an angle with each other less than 180° and suitably so large that the angle between either of the tangent planes and the axis of rotation of the ball bearing is less than 15°.

---

This invention is concerned with ball bearings of the grooved type which are designed principally to carry thrust loads, and more particularly relates to a bearing of this type to be mounted as a unit.

The grooved-type bearings as hitherto suggested are capable of carrying very light thrust loads. Where heavy thrust loads occur use has been made of angular-contact bearings but these bearings are disadvantageous inter alia because they can carry thrust but in one direction only, which restrict their usefulness. Unfortunately, experience has shown that even skilled mechanics may commit the fault of mounting such a bearing in reversed position, which may result in heavy damages. The reason why conventional grooved type bearings are not capable of carrying a heavy thrust is that at axial load and small clearance in the bearing the tangent plane of the contact point makes a very small angle with the direction of the axial load whereby the ball races are exposed to high compressive forces. This phenomenon will be elucidated in a further detail in the following.

The object of the present invention is to provide a ball bearing which presents the advantages of both the grooved-type bearing and the angular-contact bearing, but none of their disadvantages.

The characteristic features of the invention reside in that both the inner ring ball race and the outer ring ball race has two surfaces which are formed by portions of a cone shell or zones of a sphere or generated by a rotating curved line so that each of the balls engages both the inner ring and the outer ring races at two separate points of contact, and that the tangent planes at these points of contact make an angle with each other less than 180° and suitably so large that the angle between either of the tangent planes and the axis of rotation of the ball bearing is less than 15°.

For better understanding the invention will be described more in detail hereinafter, reference being made to the accompanying drawing in which:

FIG. 1 shows a cross section of the upper half of an assumed bearing for illustration of the force relations therein;

FIG. 2 shows a diagram illustrating the said force relations at various angles;

FIG. 3 shows a cross section of the upper half of a bearing according to the invention;

FIG. 4 shows a cross section of the upper half of a modified embodiment of the bearing according to the invention.

The basic principles of the invention will appear from FIG. 1 where one of a number of balls 1 of a ball bearing is disposed between two races 2, one race being that of the outer ring 4 and the other race that of the inner ring 6. The angle between the races and the axis of rotation of the bearing is designated $b$ and is the same for both planes. A thrust designated A acts in axial direction on the inner ring 6 and is distributed on the balls 1 and transferred by them to the outer ring 4. As only normal forces perpendicular to a plane of engagement can be transferred through the balls 1 the normal force N will be composed of the thrust A and a radial load R which tends to widen the outer ring 4 and thus acts as a tensile stress in said ring. The radial load will of course make itself felt as compression load on the inner ring 6. The size of the normal force N will thus be $N = A \cot b$ and the relation $N/A = \cot b$.

The relation of the normal force N to the thrust A will appear from the following table of various values of $b$ expressed in degrees:

| $b=0$: | $N/A=\infty$ |
|---|---|
| 1 | 57.29 |
| 2 | 28.64 |
| 3 | 19.08 |
| 4 | 14.30 |
| 5 | 11.43 |
| 6 | 9.51 |
| 7 | 8.14 |
| $b=8$: | $N/A=7.11$ |
| 9 | 6.31 |
| 10 | 5.67 |
| 11 | 5.14 |
| 12 | 4.70 |
| 13 | 4.33 |
| 14 | 4.01 |
| 15 | 3.73 |
| $b=$: | $N/A=$ |
| 20 | 2.75 |
| 25 | 2.14 |
| 30 | 1.73 |

Said relation is illustrated by the diagram in FIG. 2. It appears from this that at angles smaller than 1°, which may be considered to apply to a conventional grooved-type bearing with insignificant clearance, the normal force N will be more than 57 times greater than the thrust A. Since the load carrying capacity and the life of a bearing is dependent on the size of the normal force N it will clearly appear that a conventional grooved-type bearing has a relatively low capability of carrying thrust loads.

Also in the embodiment, shown in FIG. 3, of the ball bearing according to the present invention one of the balls of the bearing is designated 1. In this instance, the outer ring 4 of the bearing comprises two facing rings 3 and 5 having races 2', and the inner ring 6 of the bearing comprises two facing rings 7 and 9 having races 2'. The races 2' which here are conical, i.e. generated by a straight line, are so arranged that they and as a consequence also the tangents at the points of engagement of the ball 1 encounter one another under an angle $c$ less than 180°. If the angle $b$ between the tangents and the axial direction is the same on each side one obtains $c+2b=180°$. As will appear from FIG. 4 the races, here designated 2", may also have a double curvature, i.e. be generated by a curved line.

The rings 3, 5 and 7, 9, respectively, comprised in the outer ring 4 and the inner ring 6 of the bearing, respectively, may be made in pairs in an integral piece, but as the ball will never engage the line of connection between them they may also be made separately in the manner appearing from FIG. 3. To keep the ring portions together an external ring 8 is placed around the rings 3, 5 and an internal ring 10 is disposed inside the rings 7, 9. The retaining rings 8 and 10 may be mounted by shrinking or in other suitable manner. By making the outer and inner ring assemblies, respectively, in portions designed to be assembled one obtains inter alia the advantage that more balls can be accommodated in the bearing so that it can carry heavier loads. As the balls can never engage the joint between the race rings it is not absolutely necessary that the latter are in mutual engagement at the joint. This implies that there are reasonable limits for the degree to which the rings have to be machined. A further advantage from the viewpoint of manufacture is that the race rings are identical in pairs, which will reduce the manufacturing costs.

If the ball bearing according to the present invention is exposed to radial load the balls will uniformly engage the two races of the outer and inner rings, which in some cases may causes a slightly higher wear than in a conventional grooved-type bearing. In such a case it is recommended to use a bearing of that type. However, it rarely happens that a bearing is exposed to radial load only. On the other hand, the bearing according to the invention is superior as soon as there occurs a thrust load larger in relation to the radial load than the tangent for the angle $b$. The balls will efficiently engage at one point only of each of the races of the outer and inner rings. Should the bearing, as is often the case, then have a certain clearance and should the balls not have been mounted under bias the opposite races will thus be unloaded.

The following table shows the values for the tangent $b°$ and thus the value that the relation of thrust to radial load should exceed to provide an efficient engagement on one side:

$b=$:

| | Tg $b$ |
|---|---|
| 1 | 0.017 |
| 2 | 0.035 |
| 3 | 0.052 |
| 4 | 0.070 |
| 5 | 0.087 |
| 6 | 0.105 |
| 7 | 0.123 |
| 8 | 0.14 |

$b=$:

| | Tg $b$ |
|---|---|
| 9 | 0.16 |
| 10 | 0.19 |
| 11 | 0.176 |
| 12 | 0.212 |
| 13 | 0.23 |
| 14 | 0.25 |
| 15 | 0.268 |

$b=$:

| | Tg $b$ |
|---|---|
| 20 | 0.364 |
| 25 | 0.466 |
| 30 | 0.577 |

It will appear from the above table that at an angle $b$ between the planes of engagement or the tangent planes and the axis of rotation of the bearing in the order of 4°, the balls as described in the foregoing will efficiently engage at a point of the outer and inner rings as soon as the thrust is greater than 7% of the radial load, which occurs in an extremely great number of load cases. When the angle $b$ is 15° the thrust A should amount to 26.8% of the radial load in order that said one-point engagement shall occur. When the angle $b$ is 10° a thrust of 19% of the radial load is necessary, and it has proved suitable to keep the angle $b$ below this value. It should, however, be observed that an angle $b$ of 10° gives a normal pressure N which only amounts to about a tenth (5.67/57.29) of the normal pressure in the same load case with the angle $b=1°$. Where very light thrusts A occur the angle $b$ may be set at 6°, and in that case the thrust A need amount to not less than 10% of the radial load R in order that the favourable one-point engagement shall occur. The normal pressure N will then amount to approximately one sixth of that in a conventional grooved-type bearing.

It will be obvious to those skilled in the art that various modifications may be made without departing from the scope of the invention, and threfore the invention is not limited to what is described in the specification and shown in the drawing, but only as indicated in the appended claims.

What I claim and desire to secure by Letters Patent is:

1. A ball bearing designed to carry both radial loads and thrust loads and to be mounted as a unit, comprising an outer bearing ring having a raceway extended around the inner wall of the same, an inner bearing ring having a raceway extended around the outer wall of the same, a set of balls received within both raceways, holder means for said balls and raceways, said outer ring ball raceway and said inner ring ball raceway having two surfaces so that each of said balls engages both said inner ring ball raceway and said outer ring ball raceway at two separated points of contact wherein the ball tangent planes at these points of contact make an angle with other less than 180° and the angle between either of the tangent planes and the axis of rotation of the ball bearing is less than 15°.

2. A ball bearing as set forth in claim 1 wherein said two surfaces are formed by portions of the shell of a cone frustum.

3. A ball bearing as set forth in claim 1 wherein said two surfaces are formed by the surface of a zone of a sphere.

4. A ball bearing as set forth in claim 1 wherein said two surfaces are generated by a rotating curved line.

5. A ball bearing as set forth in claim 1 wherein the angle between either of the tangent planes and the axis of rotation of the ball bearing is between 4° and 10°.

6. A ball bearing as set forth in claim 1 wherein the angle between either of the tangent planes and the axis of rotation of the ball bearing is between 3° and 15°.

7. A ball bearing as set forth in claim 1 wherein the angle between either of the tangent planes and the axis of rotation of the ball bearing is between 4° and 6°.

References Cited

UNITED STATES PATENTS 827,865   8/1906   Harris et al. _____ 308—196

MARTIN P. SCHWADRON, *Primary Examiner.*

FRANK SUSKO, *Examiner.*